United States Patent [19]

Dunnigan

[11] Patent Number: 5,086,902
[45] Date of Patent: Feb. 11, 1992

[54] LADDER FOR FRAGILE PARTICULATE COMMODITIES

[76] Inventor: Theodore J. Dunnigan, Hwy. 32 N., P.O. Box 67, Walhalla, N. Dak. 58282

[21] Appl. No.: 619,083

[22] Filed: Nov. 28, 1990

[51] Int. Cl.$^5$ .............................................. B65G 11/00
[52] U.S. Cl. ...................... 193/25 C; 193/27
[58] Field of Search .............. 193/27, 7, 25 C, 25 R; 198/603, 536

[56] References Cited

U.S. PATENT DOCUMENTS

| | | | |
|---|---|---|---|
| 233,971 | 10/1880 | Kent | 213/198 |
| 976,871 | 11/1910 | Hammond | 193/27 X |
| 1,133,436 | 3/1915 | Gramling | 193/27 X |
| 1,583,833 | 5/1926 | Howell | 193/27 |
| 2,374,864 | 5/1945 | Hawes | 193/7 |
| 2,502,341 | 3/1950 | Queirolo | 193/27 |
| 2,693,264 | 11/1954 | Waterbury | 193/7 |
| 3,348,647 | 10/1967 | Gates et al. | 193/7 |
| 3,926,290 | 12/1975 | Isojima et al. | 193/27 |
| 4,161,243 | 7/1979 | Grisnich | 193/27 |
| 4,456,113 | 6/1984 | Thibault | 193/7 |
| 4,750,602 | 6/1988 | Souda | 193/7 X |
| 4,946,018 | 8/1990 | Binzen et al. | 193/27 X |

*Primary Examiner*—Robert P. Olszewski
*Assistant Examiner*—Cheryl L. Gastineau
*Attorney, Agent, or Firm*—Zarley, McKee Thomte Voorhees & Sease

[57] ABSTRACT

An apparatus for lowering particulate commodities includes a vertically disposed ladder extending from the upper end of the storage facility to the lower end of the storage facility. The ladder is formed of flexible planar sheets bent upon themselves to define substantially U-shaped chute member formed into a zigzag patttern such that the particulate commodities flow downward through the chute members passing from one chute member to the next chute member. The chute members are connected such that an opening is formed at the upper end of each chute member so that the commodities may exit the ladder once the level of the commodity within the storage facility has reached the upper end of a particular chute member.

3 Claims, 4 Drawing Sheets

LADDER FOR FRAGILE PARTICULATE COMMODITIES

TECHNICAL FIELD

The present invention relates generally to a ladder for lowering fragile, particulate commodities into a storage facility, and more particularly to a ladder which may remain in place within the storage facility during loading of the facility.

BACKGROUND OF THE INVENTION

Zigzag shaped chutes have long been utilized to lower fruits and vegetables from an upper level to a lower level, to avoid damaging the commodities. The falling speed of the commodities is reduced by frequently changing the direction that the commodity is falling within the chute.

One problem with prior art zigzag chutes is in the need to remove the chute as the storage facility is filled with the commodity, to prevent damage to the chute under the pressure of the commodity within the storage facility. To avoid damage to the chute, prior art chutes are designed to be progressively raised with the level of the commodity in the facility. However, this capability complicates the structure of the chute, requiring additional time and labor in construction, and adding to the overall weight of the finished chute.

It is therefore a general object of the present invention to provide an improved ladder for lowering fragile commodities within a storage facility.

Another object is to provide a ladder which is resiliently collapsible so that it may remain in a storage facility after filling of the facility, and yet be reusable.

A further object of the present invention is to provide a ladder which is light weight, simple in operation and economical to manufacture.

Yet another object is to provide a ladder which is adjustable to cause different flow rates of commodities therethrough.

These and other objects of the present invention will be apparent to those skilled in the art.

SUMMARY OF THE INVENTION

The apparatus for lowering particulate commodities into a storage facility includes a vertically disposed ladder extending from the upper end of the storage facility to the lower end of the storage facility. The ladder is formed of flexible planar sheets bent upon themselves to define substantially U-shaped chute member formed into a zigzag pattern such that the particulate commodities flow downward through the chute members passing from one chute member to the next chute member. The chute members are connected such that an opening is formed at the upper end of each chute member so that the commodities may exit the ladder once the level of the commodity within the storage facility has reached the upper end of a particular chute member.

DESCRIPTION OF THE PREFERRED EMBODIMENT

Figure 1:
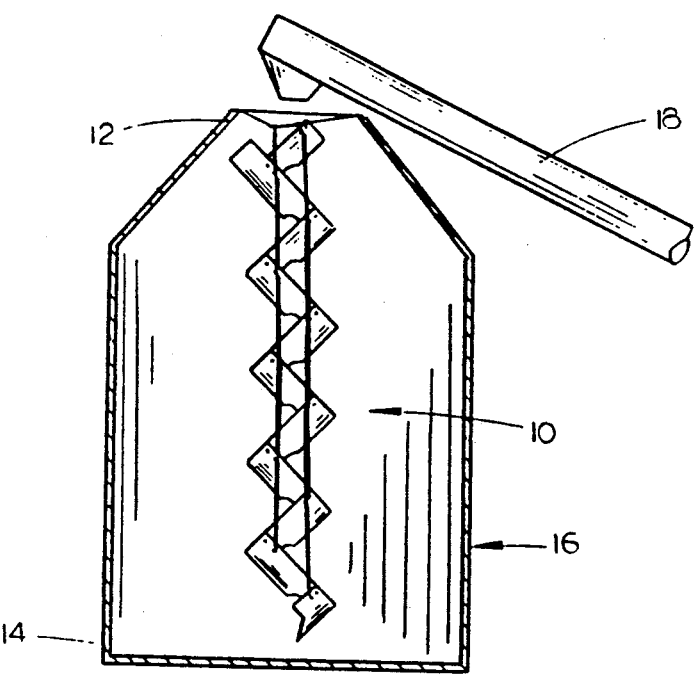
FIG. 1 is a sectional view through a storage facility showing the ladder of the present invention in operating position.

Referring now to the drawings, in which similar or corresponding parts are identified with the same reference numerals, and more particularly to FIG. 1, the ladder of the present invention is designated generally at 10 and extends from the open upper end 12 to the lower end 14 of a storage facility 16. An auger 18 or other conveyor conveys grain 20 (seen in FIGS. 3 and 4) or other commodities to the upper end of ladder 10 and storage facility 16. Preferably, ladder 10 is utilized with fragile particulate commodities, such as beans or the like.

Figure 5:
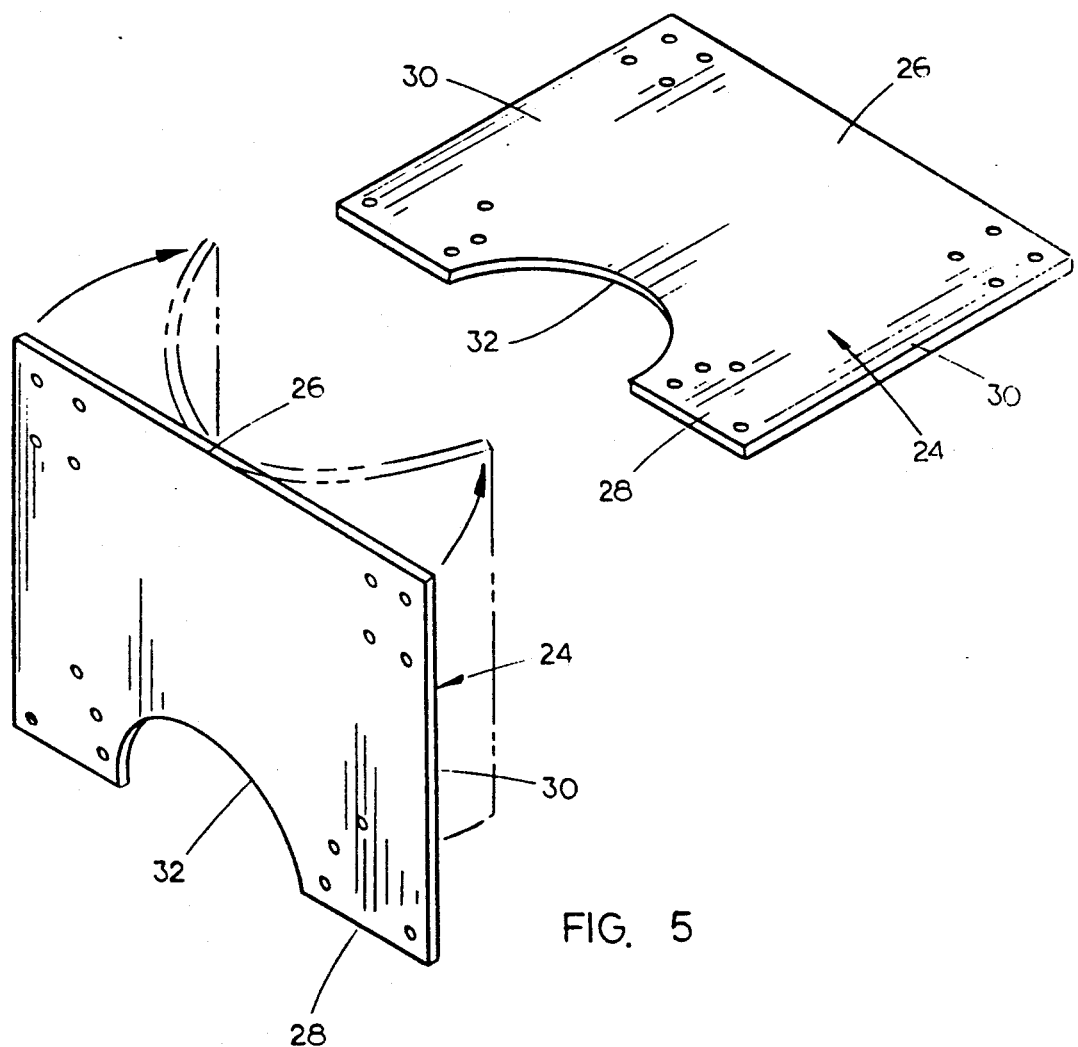
FIG. 5 is a perspective of two sections of the ladder, prior to being positioned to form chute sections.

Ladder 10 is formed of a plurality of chute sections 22 interconnected to form "zig" chutes and "zag" chutes. Each chute 22 is formed from a generally planar sheet 24 of rubber, neoprene or other resilient flexible material. Each sheet 24 has an upper edge 26, lower edge 28 and opposing side edges 30, with side edges 30 being bent back upon each other to form a generally U-shaped chute. An arcuate notch 32 is formed in lower edge 28, as shown in FIG. 5.

A set of four apertures are formed in each upper corner of sheets 24, and arranged in first and second pairs 34a and 34b. Each lower corner of sheets 24 has an aperture 36 therein, with a series of three apertures 38a, 38b and 38c arranged radially therefrom. Each sheet is then bent into a U-shaped chute, and connected end-to-end to form a zigzag ladder.

Figure 6:
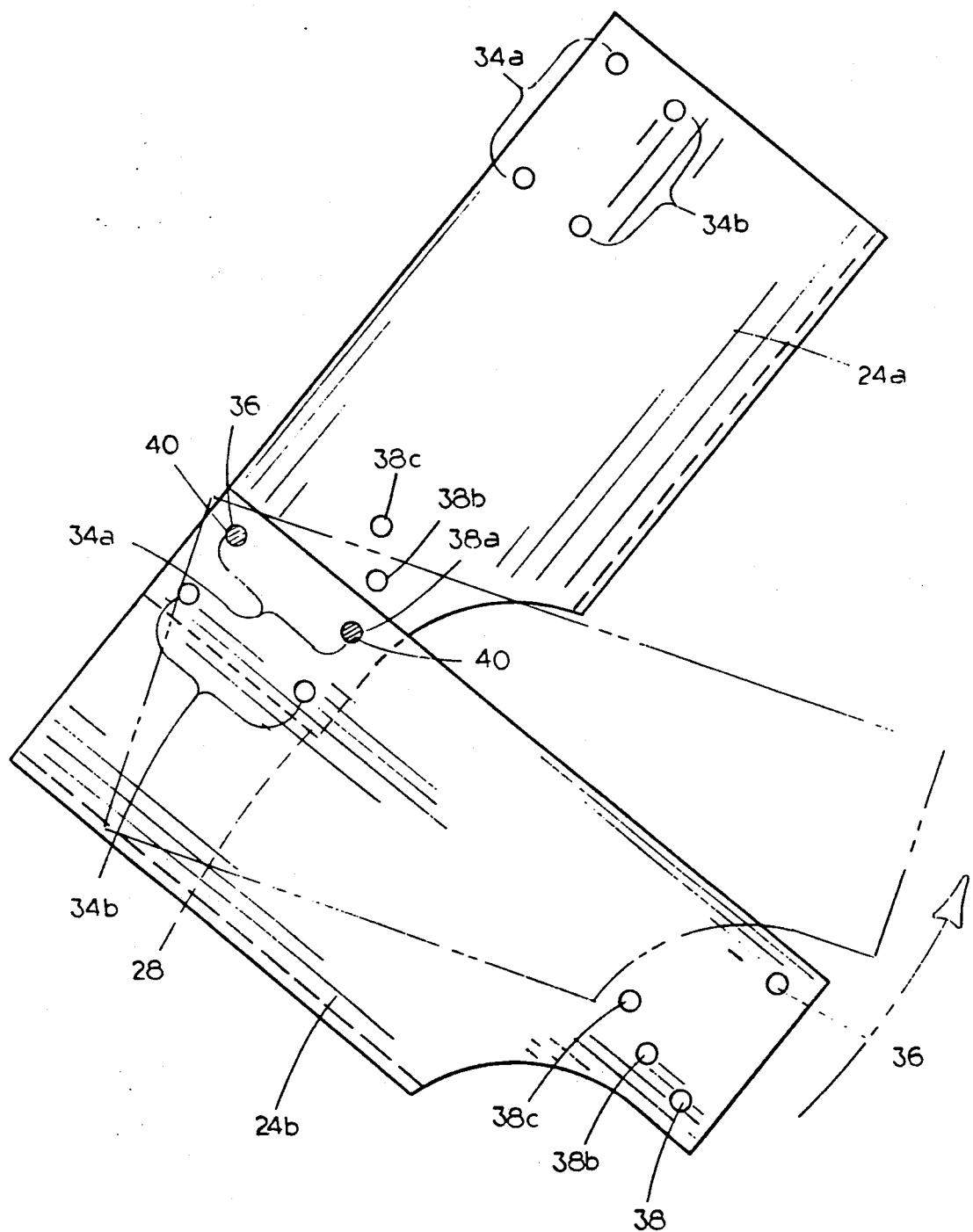
FIG. 6 is a view of a portion of the ladder formed by the chute sections of FIG. 5.

Referring to FIG. 6, one pair of apertures 34a in the upper end of sheet 24b are connected to aperture 36 and one of apertures 38a, b, or c of sheet 24a, with removable fasteners 40. Sheet 24a may be fastened with the lower edge 28 located deeper within the chute 22 formed by sheet 24b by connecting apertures 36 and 38 with the second pair of apertures 34b, so as to reduce the fall of grain from upper sheet 24a to the next lower sheet 24b. In addition, the slope of each chute 22 may be adjusted so as to vary the rate at which the grain travels through ladder 10, utilizing radially spaced apertures 38a, b, and c. As shown in broken lines in FIG. 6, connection of apertures 36 and 38b with apertures 34a, will render the slopes of chutes 22 more horizontal than the solid line setting utilizing apertures 36 and 38a. A further reduction in slope may be accomplished by utilizing apertures 38c with aperture 36.

Figure 3:
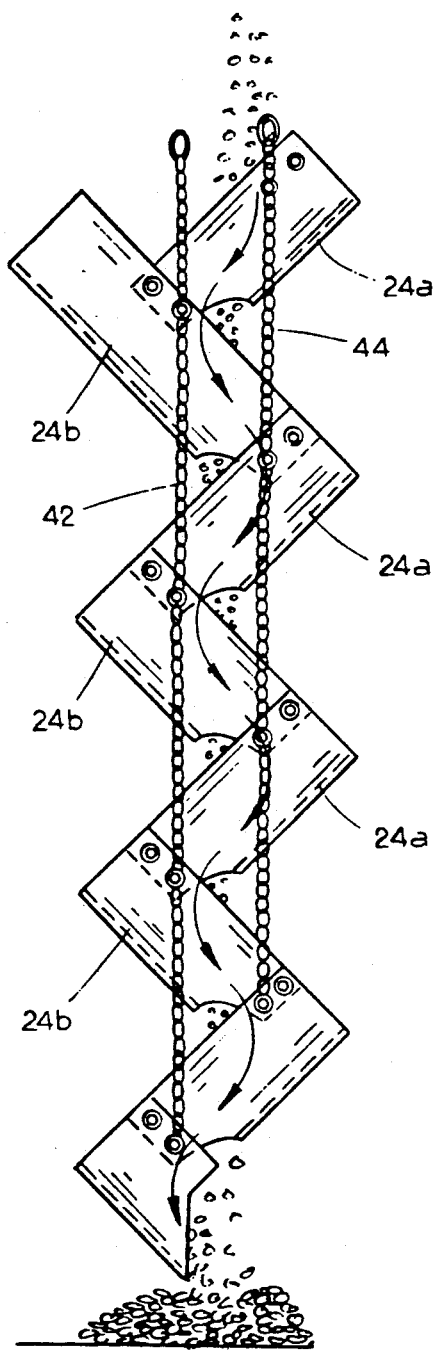
FIG. 3 is an enlarged view of FIG. 1, showing grain being lowered through the ladder.
Figure 4:
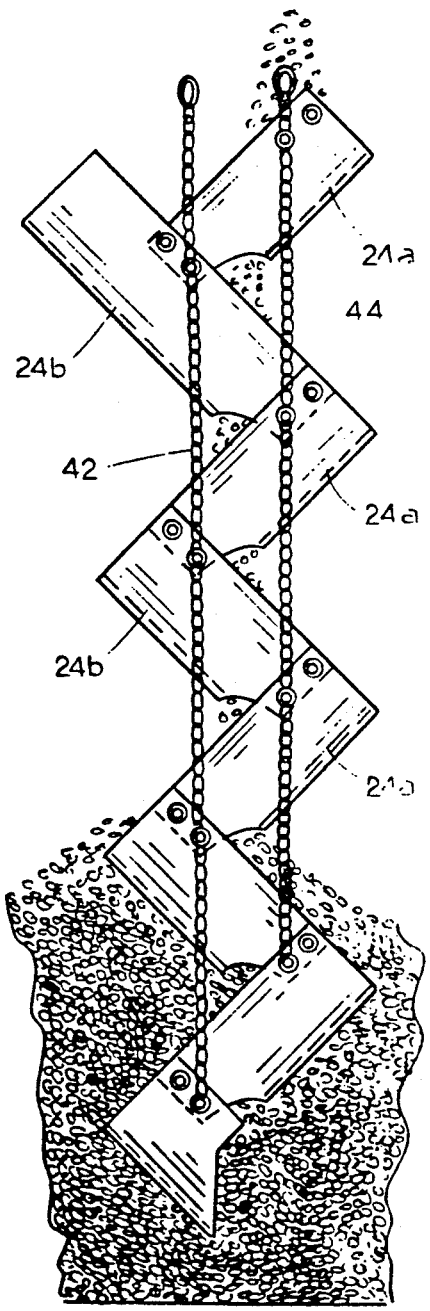
FIG. 4 is a view similar to FIG. 3, after the storage facility has been partially filled.

In this fashion, each sheet 24a forms a "zig" and each sheet 24b forms a "zag", to create a zigzag ladder 10, as shown in FIGS. 3 and 4. A chain 42 is connected to fasteners 40 of the lower ends of each "zig" chute 24a, to support ladder 10 within a storage facility. A second chain 44 is connected to the upper ends of each chute 24a, to further support ladder 10 and retain chutes 22 in their zigzag relationship.

Figure 2:
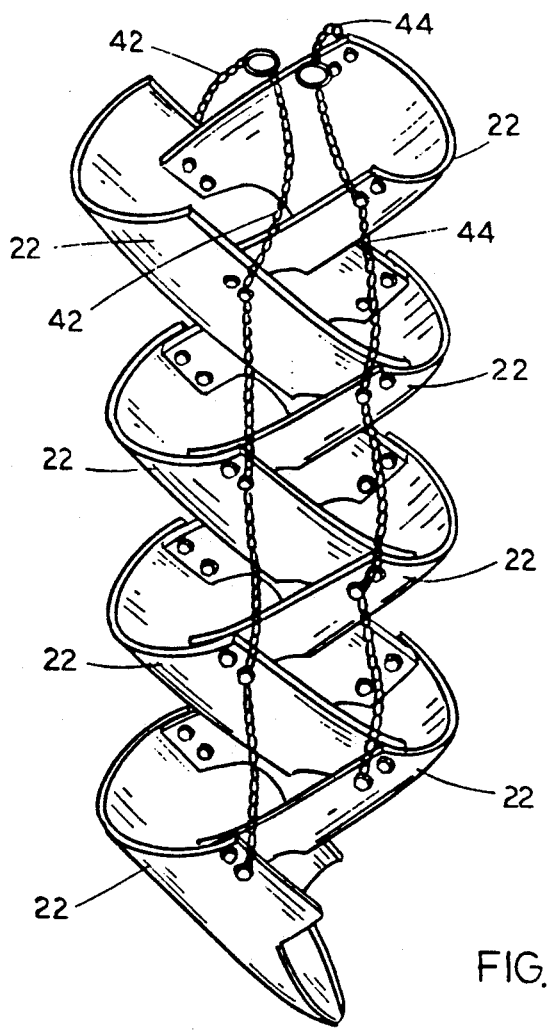
FIG. 2 is an enlarged prospective view of the ladder of this invention.

In operation, ladder 10 is formed by connecting zig and zag chutes 24a and 24b in the desired shapes and to form the desired vertical length. The upper ends of chains 42 and 44 may be connected together, as shown in FIG. 2, to permit hanging of the ladder from a support at the upper end of storage facility 16 or auger 18.

Whereas the invention has been shown and described in connection with the preferred embodiment thereof, it will be understood that many modifications, substitutions and additions may be made which are within the intended broad scope of the appended claims. There has therefore been shown and described an improved ladder for lowering fragile commodities which accomplishes at least all of the above-stated objects.

I claim:

1. An apparatus for lowering fragile, particulate commodities into a commodity storage facility, comprising:

a vertically disposed ladder means having upper and lower ends;

means for supporting said ladder means within the storage facility so that the lower end thereof is positioned adjacent the lower end of the storage facility;

the upper end of said ladder means being in communication with a source of commodities;

said ladder means comprising a plurality of resilient, flexible planar sheets bent upon themselves to define a substantially U-shaped cute member having upper and lower ends;

said chute members being formed of a material which will resiliently deform and return to its original shape, whereby said chute members will cushion the fall of the said particulate commodities;

the lower ends of each chute member, except the lower most member, being secured to the upper ends of the chute members positioned therebelow, said chute members defining a zigzag pattern, whereby the particulate commodities will flow downward through said chute members passing from one chute member to the next chute member positioned therebelow;

adjacent chute members defining an opening at the connection therebetween whereby the particulate commodities may exit the ladder therethrough once the level of commodity within the storage facility has reached the level; and means for selectively, adjustably securing the lower ends of the chute members to the upper ends of the chute members positioned therebelow, so as to selectively and individually adjust the slope of each chute member in the zigzag pattern, whereby the speed at which a commodity passes through said ladder means may be adjusted.

2. The apparatus of claim 1, wherein said means for supporting said ladder means within the storage facility and for selectively adjusting the slope of the chute members includes a flexible chain means connected to the upper ends of parallel chute members defining the "zig" portion of the zigzag pattern.

3. The apparatus of claim 2, wherein said means for supporting said ladder means within the storage facility and for selectively adjusting the slope of the chute members further includes chain means connected to the upper ends of the parallel chutes forming the "zag" portion of the zigzag pattern.

* * * * *